US012598513B2

(12) United States Patent
Takahashi et al.

(10) Patent No.: US 12,598,513 B2
(45) Date of Patent: Apr. 7, 2026

(54) TERMINAL AND COMMUNICATION METHOD FOR BANDWIDTH CONFIGURATION

(71) Applicant: NTT DOCOMO, INC., Tokyo (JP)

(72) Inventors: Hideaki Takahashi, Tokyo (JP);
Yousuke Sano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 502 days.

(21) Appl. No.: 17/753,419

(22) PCT Filed: Sep. 5, 2019

(86) PCT No.: PCT/JP2019/035050
§ 371 (c)(1),
(2) Date: Mar. 2, 2022

(87) PCT Pub. No.: WO2021/044598
PCT Pub. Date: Mar. 11, 2021

(65) Prior Publication Data
US 2022/0295350 A1 Sep. 15, 2022

(51) Int. Cl.
*H04W 28/20* (2009.01)
*H04L 27/26* (2006.01)
*H04W 72/044* (2023.01)
*H04W 72/21* (2023.01)

(52) U.S. Cl.
CPC ....... *H04W 28/20* (2013.01); *H04L 27/26025* (2021.01); *H04W 72/044* (2013.01); *H04W 72/21* (2023.01)

(58) Field of Classification Search
None
See application file for complete search history.

(56) References Cited

U.S. PATENT DOCUMENTS

2021/0352672 A1* 11/2021 Wu ....................... H04W 16/14

OTHER PUBLICATIONS

3GPP TSG-RAN2 Meeting #107; R2-1911869 "Channel Bandwidth validation upon SIB1 acquisition" Ericsson, ZTE Corporation; Prague, Czech Republic; Aug. 26-30, 2019 (7 pages) (Year: 2019).*
3GPP TS 38.331 V15.5.1 "3rd Generation Partnership Project; Technical Specification Group Radio Access Network; NR; Radio Resource Control (RRC) protocol specification (Release 15)" Apr. 2019 (491 pages) (Year: 2019).*
Office Action issued in counterpart Japanese Patent Application No. 2021-543904 mailed on May 23, 2023 (5 pages).
Ericsson et al; "Channel Bandwidth validation upon SIB1 acquisition"; 3GPP TSG-RAN2 Meeting #107, R2-1910706; Prague, Czech Republic; Aug. 26-30, 2019 (7 pages).

(Continued)

*Primary Examiner* — Saad Khawar
(74) *Attorney, Agent, or Firm* — Osha Bergman Watanabe & Burton LLP

(57) ABSTRACT
A terminal includes a receiving unit that receives system information; and a control unit, wherein, in a case where the system information received by the receiving unit includes information related to a Supplementary Uplink, and a configuration of a maximum bandwidth, from among one or more bandwidths for the Supplementary Uplink, is supported, the control unit configures the maximum bandwidth as a frequency bandwidth for communicating through the Supplementary Uplink.

3 Claims, 6 Drawing Sheets

(56) References Cited

OTHER PUBLICATIONS

3GPP TSG-RAN WG2 Meeting #106; R2-1908301 "LS on supported BW for initial BWP" TSG RAN WG2; Reno, USA; May 13-17, 2019 (2 pages).

3GPP TSG-RAN2 Meeting #107; R2-1911869 "Channel Bandwidth validation upon SIB1 acquisition" Ericsson, ZTE Corporation; Prague, Czech Republic; Aug. 26-30, 2019 (7 pages).

3GPP TSG RAN WG1 Meeting #97; R1-1906657 "On wideband operation in NR-U" Nokia, Nokia Shanghai Bell; Reno, Nevada, USA; May 13-17, 2019 (15 pages).

3GPP TS 38.101-1 V15.5.0 "3rd Generation Partnership Project; Technical Specification Group Radio Access Network; NR; User Equipment (UE) radio transmission and reception; Part 1: Range 1 Standalone (Release 15)" Mar. 2019 (239 pages).

3GPP TS 38.331 V15.5.1 "3rd Generation Partnership Project; Technical Specification Group Radio Access Network; NR; Radio Resource Control (RRC) protocol specification (Release 15)" Apr. 2019 (491 pages).

3GPP TS 38.213 V15.5.0 "3rd Generation Partnership Project; Technical Specification Group Radio Access Network; NR; Physical layer procedures for control (Release 15)" Mar. 2019 (104 pages).

International Search Report issued in International Application No. PCT/JP2019/035050, mailed Apr. 14, 2020 (3 pages).

Written Opinion issued in International Application No. PCT/JP2019/035050; Dated Apr. 14, 2020 (3 pages).

* cited by examiner

SS/PBCH block
CSI-RS
PDCCH
PDSCH

PRACH
PUCCH
PUSCH

20

10

CELL

FIG.2

```
MIB ::=                           SEQUENCE {
  systemFrameNumber                 BIT STRING (SIZE (6)),
  subCarrierSpacingCommon           ENUMERATED {scs15or60, scs30or120},
  ssb-SubcarrierOffset              INTEGER (0..15),
  dmrs-TypeA-Position               ENUMERATED {pos2, pos3},
  pdcch-ConfigSIB1                  PDCCH-ConfigSIB1,
  cellBarred                        ENUMERATED {barred, notBarred},
  intraFreqReselection              ENUMERATED {allowed, notAllowed},
  spare                             BIT STRING (SIZE (1))
}

PDCCH-ConfigSIB1 ::=              SEQUENCE {
  controlResourceSetZero            ControlResourceSetZero,
  searchSpaceZero                   SearchSpaceZero
}

ControlResourceSetZero ::=       INTEGER (0..15)

SearchSpaceZero ::=              INTEGER (0..15)
```

FIG.3

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 0 |
| 5 | 1 | 48 | 1 | 28 |
| 6 | 1 | 48 | 2 | 0 |
| 7 | 1 | 48 | 2 | 28 |
| 8 | 1 | 48 | 3 | 0 |
| 9 | 1 | 48 | 3 | 28 |
| 10 | Reserved | | | |
| 11 | Reserved | | | |
| 12 | Reserved | | | |
| 13 | Reserved | | | |
| 14 | Reserved | | | |
| 15 | Reserved | | | |

FIG.4

SCS-SpecificCarrier

The IE *SCS-SpecificCarrier* provides parameters determining the location and width of the actual carrier or the carrier bandwidth. It is defined specifically for a numerology (subcarrier spacing (SCS)) and in relation (frequency offset) to Point A.

SCS-SpecificCarrier information element

```
-- ASN1START
-- TAG-SCS-SPECIFICCARRIER-START

SCS-SpecificCarrier ::=     SEQUENCE {
    offsetToCarrier             INTEGER (0..2199),
    subcarrierSpacing           subcarrierSpacing,
    carrierBandwidth            INTEGER (1..maxNrofPhysicalResourceBlocks),
    ...,
    [[
    txDirectCurrentLocation-v1530  INTEGER (0..4095)        OPTIONAL    -- Need S
    ]]
}

-- TAG-SCS-SPECIFICCARRIER-STOP
-- ASN1STOP
```

SCS-SpecificCarrier field descriptions

*carrierBandwidth*
Width of this carrier in number of PRBs (using the *subcarrierSpacing* defined for this carrier) (see TS 38.211 [16], clause 4.4.2). For the frequency band and subcarrier spacing in this cell, if the UE does not support the channel bandwidth in DL indicated by this field in *DonwlinkConfigCommon/ DownlinkConfigCommonSIB*, the UE applies the channel bandwidth in DL derived by [Condition X] until reception of *RRCSetup/RRCResume/RRCReestablishment*. For the frequency band and subcarrier spacing in this cell, if the UE does not support the channel bandwidth in UL indicated by this field in *UplinkConfigCommon/ UplinkConfigCommonSIB*, the UE applies the channel bandwidth in UL derived by [Condition X] until reception of *RRCSetup/RRCResume/RRCReestablishment*.

*offsetToCarrier*
Offset in frequency domain between Point A (lowest subcarrier of common RB 0) and the lowest usable subcarrier on this carrier in number of PRBs (using the subcarrierSpacing defined for this carrier). The maximum value corresponds to 275*8-1. See TS 38.211 [16], clause 4.4.2.

*txDirectCurrentLocation*
Indicates the downlink Tx Direct Current location for the carrier. A value in the range 0..3299 indicates the subcarrier index within the carrier. The values in the value range 3301..4095 are reserved and ignored by the UE. If this field is absent for downlink within *ServingCellConfigCommon* and *ServingCellConfigCommonSIB1*, the UE assumes the default value of 3300 (i.e. "Outside the carrier"). (see TS 38.211 [16], clause 4.4.2). Network does not configure this field via *ServingCellConfig* or for uplink carriers.

*subcarrierSpacing*
Subcarrier spacing of this carrier. It is used to convert the offsetToCarrier into an actual frequency. Only the values 15 kHz, 30 kHz or 60 kHz (FR1), and 60 kHz or 120 kHz (FR2) are applicable.

TERMINAL AND COMMUNICATION METHOD FOR BANDWIDTH CONFIGURATION

TECHNICAL FIELD

The present invention relates to a terminal and a communication method in a radio communication system.

BACKGROUND ART

In The 3rd Generation Partnership Project (3GPP), a radio communication system called New Radio (NR) or 5G has been studied in order to achieve a larger system capacity, a higher data transmission rate, and lower latency in a radio section. In order to achieve a throughput of higher than or equal to 10 Gbps and to satisfy a requirement that latency in a radio section is reduced to be less than or equal to 1 ms, various types of radio technology have been studied.

Currently, in the 3GPP meeting, it has been discussed how a terminal (user equipment) use a bandwidth of a channel broadcast by SIB'.

PRIOR ART DOCUMENT

Non-Patent Document

Non-Patent Document 1: 3GPP TSG-RAN WG2 Meeting #106, R2-1908301, Reno, USA, 13-17 May 2019
Non-Patent Document 2: 3GPP T538.101-1 V15.5.0(2019-03)
Non-Patent Document 3: 3GPP T538.331 V15.5.1(2019-04)
Non-Patent Document 4: 3GPP T538.213 V15.5.0(2019-03)

SUMMARY OF THE INVENTION

Problem to be Solved by the Invention

In a case in which the terminal supports a bandwidth for a supplementary uplink indicated by the SIB1, it is necessary to clearly specify a frequency bandwidth used for the terminal to perform communication until a channel bandwidth that is actually supported is configured.

Means for Solving the Problem

According to an aspect of the present invention, there is provided a terminal including a receiving unit that receives system information; and a control unit, wherein, in a case where the system information received by the receiving unit includes information related to a Supplementary Uplink, and a configuration of a maximum bandwidth, from among one or more bandwidths for the Supplementary Uplink, is supported, the control unit configures the maximum bandwidth as a frequency bandwidth for communicating through the Supplementary Uplink.

Advantage of the Invention

According to an embodiment, a method of clearly specifying, in a case in which a terminal supports a bandwidth for a supplementary uplink indicated by SIB1, a frequency bandwidth used for the terminal to perform communication until a channel bandwidth that is actually supported is configured.

BRIEF DESCRIPTION OF DRAWINGS

FIG. 2 is a diagram illustrating an example of a Master Information Block;

FIG. 3 is a diagram illustrating an example of information that can be configured in a terminal by controlResourceSetZero;

FIG. 4 is a diagram illustrating an example of a modification of a technical specification of a SCS-SpecificCarrier information element;

EMBODIMENTS OF THE INVENTION

In the following, embodiments of the present invention are described with reference to the drawings. The embodiments described below are merely examples, and embodiments to which the present invention is applied are not limited to the following embodiments.

The embodiments described below use the terms Synchronization Signal (SS), Primary SS (PSS), Secondary SS (SSS), Physical Broadcast channel (PBCH), Physical Random Access channel (PRACH), and the like, used in existing LTE. This is for convenience of descriptions and similar signals and functions may be referred to by other names. The above-described terms in NR correspond to NR—SS, NR—PSS, NR—SSS, NR—PBCH, NR—PRACH, and the like. However, even if a signal is used for NR, it is not necessarily specified as "NR—."

In the embodiments of the present invention, a duplex method may be a Time Division Duplex (TDD) method, a Frequency Division Duplex (FDD) method, or any other method (e.g., Flexible Duplex).

Furthermore, in the embodiments of the present invention, to configure a radio parameter or the like may be to pre-configure a predetermined value, or to configure a radio parameter transmitted from a base station 10 or a terminal 20.

Figure 1:
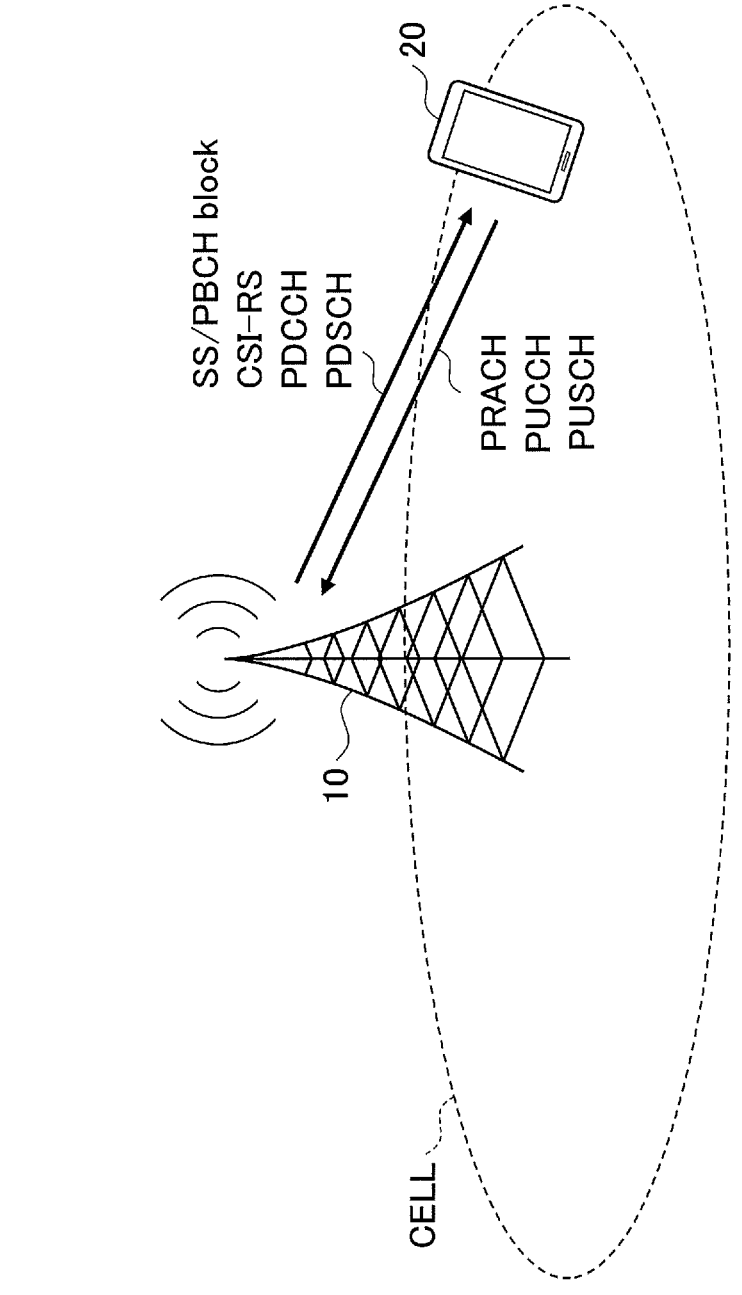
FIG. 1 is a diagram illustrating a configuration of a communication system according to an embodiment.

FIG. 1 is a diagram illustrating a radio communication system according to an embodiment of the present invention. The radio communication system in an embodiment of the present invention includes a base station 10 and a terminal 20, as illustrated in FIG. 1. In FIG. 1, one base station 10 and one terminal 20 are illustrated. However, this is an example and there may be a plurality of base stations 10 and a plurality of terminals 20.

The base station 10 is a communication device that provides one or more cells and that performs radio communication with the terminal 20. Physical resources of a radio signal are defined in a time domain and a frequency domain, the time domain may be defined by a number of OFDM symbols, and the frequency domain may be defined by a number of sub-carriers or a number of resource blocks. The base station 10 transmits synchronization signals and system information to the terminal 20. The synchronization signals are, for example, NR—PSS and NR—SSS. A part of the system information is transmitted, for example, by NR—PBCH, and is also called broadcast information. The synchronization signal and broadcast information may be periodically transmitted as an SS block (SS/PBCH block) formed of a predetermined number of OFDM symbols. For example, the base station 10 transmits a control signal or data in Downlink (DL) to the terminal 20 and receives a control signal or data in Uplink (UL) from the terminal 20.

Both the base station 10 and the terminal 20 are capable of beam forming to transmit and receive signals. For example, as illustrated in FIG. 1, a reference signal transmitted from the base station 10 includes a CSI-RS (Channel State Information Reference Signal) and a channel transmitted from the base station 10 includes a PDCCH (Physical Downlink Control Channel) and a PDSCH (Physical Downlink Shared Channel).

The terminal 20 is a communication device with a radio communication function, such as a smartphone, a cellular phone, a tablet, a wearable terminal, and a communication module for Machine-to-Machine (M2M). The terminal 20 may be referred to as a User Equipment (UE) 20. The terminal 20 utilizes various communication services provided by a radio communication system by receiving control signals or data from the base station 10 in DL and transmitting control signals or data in UL to the base station 10. For example, as illustrated in FIG. 1, channels transmitted from the terminal 20 include Physical Uplink Control Channel (PUCCH) and Physical Uplink Shared Channel (PUSCH).

(PDCCH-ConfigSIB1 in Release 15 NR)

The PDCCH-ConfigSIB1 in the Release 15 NR is an Information Element (IE) included in a Master Information Block (MIB).

As illustrated in FIG. 2, PDCCH-ConfigSIB1 includes two IEs, controlResourceSetZero and searchSpaceZero. The controlResourceSetZero and the searchSpaceZero are four-bit parameters for indicating one integer value in a range from 0 to 15, respectively.

During a cell search, the terminal 20 derives a number of resource blocks and a number of symbols of a CORESET from the four most signal bits (MSB) of the PDCCH-ConfigSIB1, if it determines, based on the MIB, that there is a Control-Resource set (CORESET) of the Type 0-PDCCH Common Search Space (CSS). Here, the four MSBs of PDCCH-ConfigSIB1 correspond to the controlResourceSetZero. In addition, the terminal 20 derives PDCCH monitoring occasions from the four lease signal bits (LSB) of the PDCCH-ConfigSIB1. Here, the four LSBs of PDCCH-ConfigSIB1 correspond to searchSpaceZero.

(controlResourceSetZero, CORESET #0)

FIG. 3 is a diagram illustrating an example of content of information that can be configured in the terminal 20 by the controlResourceSetZero (Non-Patent Document 3). For example, if a 30 kHz sub-carrier spacing is applied and the minimum channel bandwidth is 40 MHz, the terminal 20 interprets the four bits of the controlResourceSetZero based on the table shown in FIG. 3. The 4-bit value corresponds to the Index in the table in FIG. 3, and the Index takes one integer value in a range from 0 to 15. The terminal 20 configures a SS/PBCH block (which may be referred to as an SS/PBCH block, an SS block, or an SSB) and Control-resource set (CORESET) multiplexing pattern, a number of resource blocks (RB) of CORESET, a number of symbols of CORESET, and a resource block level offset between the SS/PBCH block and the CORESET, based on the values of the indicated by the Index, as illustrated in the table of FIG. 3.

Currently, in the 3GPP meeting, it has been discussed as to how a terminal 20 (user equipment) uses a channel bandwidth (channel bandwidth) indicated in System Information Block 1 (SIB1).

If the terminal 20 does not support a channel bandwidth indicated by SIB 1, in the current mechanism, after setting up an RRC connection between the terminal 20 and the base station 10, it is assumed that the base station 10 detects UE Capability transmitted by the terminal 20 and, based on the UE Capability, individually signals, to the terminal 20, a channel bandwidth actually supported by the terminal 20 via a Radio Resource Control (RRC) reconfiguration message.

However, it is unclear how to configure a channel bandwidth used for transmitting an uplink signal from the terminal 20 and for receiving a downlink signal by the terminal 20 during setting up of an RRC connection between the terminal 20 and the base station 10, and a channel bandwidth used for transmitting the UE Capability by the terminal 20, before the base station 10 detects the UE Capability of the terminal 20 and transmits an RRC reconfiguration message.

SIB1 includes an information element that is SCS-SpecificCarrier. The SCS-SpecificCarrier is a parameter for determining carrier information for a specific numerology (subcarrier spacing (SCS)) for an initial Bandwidth Part. The SCS-SpecificCarrier includes an information element carrierBandwidth. The information element carrierBandwidth specifies the channel bandwidth commonly used by the terminal 20.

Here, it is proposed that, if the terminal 20 does not support a carrier bandwidth indicated by SIB 1, after the carrier bandwidth is indicated by the SIB 1, a carrierBandwidth information element is changed to, for example, content illustrated in FIG. 4 in order to clearly specify an uplink bandwidth and a downlink bandwidth for communication by the terminal 20 until the base station 10 configures, for the terminal 20, a channel bandwidth actually supported by the terminal 20 by dedicated signaling based on the UE capability received from the terminal 20.

FIG. 4 is a diagram illustrating an example of a modification of a technical specification of the SCS-SpecificCarrier information element. In the example of FIG. 4, the definition of the carrierBandwidth information element included in the SCS-SpecificCarrier information element is modified.

According to the definition of the carrierBandwidth information element illustrated in the example of FIG. 4, if the terminal 20 does not support the channel bandwidth of the DL specified by the carrierBandwidth field in the Down-linkConfigCommon/DownlinkConfigCommonCommon-SIB with respect to the frequency band and subcarrier spacing within the cell, the terminal 20 may apply the channel bandwidth of the DL derived by the condition X until reception of the RRCSetup/RRCResume/RRCRestablishment. Furthermore, with respect to frequency band and sub-carrier spacing within the cell, if terminal 20 does not support the channel bandwidth of UL specified by the carrierBandwidth field in the UplinkConfigCommon/Up-linkConfigCommonSIB, terminal 20 may apply the channel bandwidth of UL derived by condition X until reception of the RRCSetup/RRCResume/RRCRestablishment.

As the condition X, specifically, at least 12 conditions, which are Alt. 1 to Alt. 12, can be considered.

(Alt. 1)

The terminal 20 may configure, when the terminal 20 is unable to support a carrier bandwidth indicated by SIB1, an uplink frequency bandwidth and/or a downlink frequency bandwidth for communication by the terminal 20 to be a bandwidth (BW: Bandwidth) of CORESET #0.

(Alt. 2)

The terminal 20 may configure, when the terminal 20 is unable to support a carrier bandwidth indicated by SIB1, an uplink frequency bandwidth and/or a downlink frequency bandwidth for communication by the terminal 20 to be a maximum channel bandwidth supported by the terminal 20. For example, the maximum channel bandwidth supported by the terminal 20 may be specified by a technical specification.

(Alt. 3)

The terminal 20 may configure, when the terminal 20 is unable to support a carrier bandwidth indicated by SIB1, an uplink frequency bandwidth and/or a downlink frequency bandwidth for communication by the terminal 20 to be a minimum channel bandwidth supported by the terminal 20. For example, the minimum channel bandwidth supported by the terminal 20 may be specified by a technical specification.

(Alt. 4)

The terminal 20 may configure, when the terminal 20 is unable to support a carrier bandwidth indicated by SIB1, an uplink frequency bandwidth and/or a downlink frequency bandwidth for communication by the terminal 20 to be a minimum frequency bandwidth of a frequency bandwidth of CORESET #0 and a minimum frequency bandwidth supported by the terminal 20 (i.e., MIN {CORESET #0 BW, Minimum channel BW supported by the UE}). For example, the minimum channel frequency bandwidth supported by the terminal 20 may be specified by a technical specification.

(Alt. 5)

The terminal 20 may configure, when the terminal 20 is unable to support a carrier bandwidth indicated by SIB1, an uplink frequency bandwidth and/or a downlink frequency bandwidth for communication by the terminal 20 to be a minimum frequency bandwidth of a frequency bandwidth of CORESET #0 and a maximum frequency bandwidth supported by the terminal 20 (i.e., MIN {CORESET #0 BW, Maximum channel BW supported by the UE}). For example, the maximum channel frequency bandwidth supported by the terminal 20 may be specified by a technical specification.

(Alt. 6)

The terminal 20 may configure, when the terminal 20 is unable to support a carrier bandwidth indicated by SIB1, an uplink frequency bandwidth and/or a downlink frequency bandwidth for communication by the terminal 20 to be a maximum frequency bandwidth of a frequency bandwidth of CORESET #0 and a maximum frequency bandwidth supported by the terminal 20 (i.e., MAX {CORESET #0 BW, Maximum channel BW supported by the UE}). For example, the maximum channel frequency bandwidth supported by the terminal 20 may be specified by a technical specification.

(Alt. 7)

The terminal 20 may configure, when the terminal 20 is unable to support a carrier bandwidth indicated by SIB1, an uplink frequency bandwidth and/or a downlink frequency bandwidth for communication by the terminal 20 to be a maximum frequency bandwidth of a frequency bandwidth of CORESET #0 and a minimum frequency bandwidth supported by the terminal 20 (i.e., MAX {CORESET #0 BW, Minimum channel BW supported by the UE}). For example, the maximum channel frequency bandwidth supported by the terminal 20 may be specified by a technical specification.

(Alt. 8)

If the terminal 20 is unable to support the carrier bandwidth indicated by SIB 1, for each frequency band, a frequency bandwidth assumed by the terminal 20 may be uniquely specified in a technical specification.

(Alt. 9)

The terminal 20 may configure, when the terminal 20 is unable to support a carrier bandwidth indicated by SIB1, an uplink frequency bandwidth and/or a downlink frequency bandwidth for communication by the terminal 20 to be a minimum frequency bandwidth of a frequency bandwidth of CORESET #0, a maximum frequency bandwidth supported by the terminal 20, and a frequency bandwidth that is uniquely specified in a technical specification for a frequency band and that is assumed by the terminal 20 (i.e., MIN {CORESET #0 BW, Maximum channel BW supported by the UE, a frequency bandwidth that is uniquely specified in a technical specification for a frequency band and that is assumed by the terminal 20}).

(Alt. 10)

The terminal 20 may configure, when the terminal 20 is unable to support a carrier bandwidth indicated by SIB1, an uplink frequency bandwidth and/or a downlink frequency bandwidth for communication by the terminal 20 to be a minimum frequency bandwidth of a frequency bandwidth of CORESET #0, a minimum frequency bandwidth supported by the terminal 20, and a frequency bandwidth that is uniquely specified in a technical specification for a frequency band and that is assumed by the terminal 20 (i.e., MIN {CORESET #0 BW, Minimum channel BW supported by the UE, a frequency bandwidth that is uniquely specified in a technical specification for a frequency band and that is assumed by the terminal 20}).

(Alt. 11)

The terminal 20 may configure, when the terminal 20 is unable to support a carrier bandwidth indicated by SIB1, an uplink frequency bandwidth and/or a downlink frequency bandwidth for communication by the terminal 20 to be a maximum frequency bandwidth of a frequency bandwidth of CORESET #0, a maximum frequency bandwidth supported by the terminal 20, and a frequency bandwidth that is uniquely specified in a technical specification for a frequency band and that is assumed by the terminal 20 (i.e., MAX {CORESET #0 BW, Maximum channel BW supported by the UE, a frequency bandwidth that is uniquely specified in a technical specification for a frequency band and that is assumed by the terminal 20}).

(Alt. 12)

The terminal 20 may configure, when the terminal 20 is unable to support a carrier bandwidth indicated by SIB1, an uplink frequency bandwidth and/or a downlink frequency bandwidth for communication by the terminal 20 to be a maximum frequency bandwidth of a frequency bandwidth of CORESET #0, a minimum frequency bandwidth supported by the terminal 20, and a frequency bandwidth that is uniquely specified in a technical specification for a frequency band and that is assumed by the terminal 20 (i.e., MAX {CORESET #0 BW, Minimum channel BW supported by the UE, a frequency bandwidth that is uniquely specified in a technical specification for a frequency band and that is assumed by the terminal 20}).

(Alt. 13)

The terminal 20 may configure, when the terminal 20 is unable to support a carrier bandwidth indicated by SIB1, an uplink frequency bandwidth and/or a downlink frequency bandwidth for communication by the terminal 20 to be a maximum frequency bandwidth of a frequency bandwidth of an initial Bandwidth Part (BWP) and a maximum frequency bandwidth supported by the terminal 20 (i.e., MAX {initial BWP BW, Maximum channel BW supported by the UE}). For example, the maximum channel bandwidth supported by the terminal 20 may be specified by a technical specification. Here, as the initial BWP, any one of the initial Downlink BWP and the initial Uplink BWP may be used.

(Alt. 14)

The terminal 20 may configure, when the terminal 20 is unable to support a carrier bandwidth indicated by SIB1, a downlink frequency bandwidth for communication by the terminal 20 to be a maximum frequency bandwidth of a bandwidth of an initial Downlink BWP and a maximum frequency bandwidth supported by the terminal 20 (i.e., MAX {initial Downlink BWP BW, Maximum channel BW supported by the UE}). For example, the maximum channel bandwidth supported by the terminal 20 may be specified by a technical specification.

(Alt. 15)

The terminal 20 may configure, when the terminal 20 is unable to support a carrier bandwidth indicated by SIB1, a downlink frequency bandwidth for communication by the terminal 20 to be a maximum frequency bandwidth of a bandwidth of an initial Uplink BWP and a maximum frequency bandwidth supported by the terminal 20 (i.e., MAX {initial Uplink BWP BW, Maximum channel BW supported by the UE}). For example, the maximum channel bandwidth supported by the terminal 20 may be specified by a technical specification.

(Alt. 16)

The terminal 20 may configure, when the terminal 20 is unable to support a carrier bandwidth indicated by SIB1, an uplink frequency bandwidth for communication by the terminal 20 to be a maximum frequency bandwidth of a bandwidth of an initial Downlink BWP and a maximum frequency bandwidth supported by the terminal 20 (i.e., MAX {initial Downlink BWP BW, Maximum channel BW supported by the UE}). For example, the maximum channel bandwidth supported by the terminal 20 may be specified by a technical specification.

(Alt. 17)

The terminal 20 may configure, when the terminal 20 is unable to support a carrier bandwidth indicated by SIB1, an uplink frequency bandwidth for communication by the terminal 20 to be a maximum frequency bandwidth of a bandwidth of an initial Uplink BWP and a maximum frequency bandwidth supported by the terminal 20 (i.e., MAX {initial Uplink BWP BW, Maximum channel BW supported by the UE}). For example, the maximum channel bandwidth supported by the terminal 20 may be specified by a technical specification.

In the above-described Alt. 13 to Alt. 17, the initial BWP may be read as the initial Uplink BWP. Alternatively, the initial BWP may be read as the initial Downlink BWP. Alternatively or additionally, the initial Uplink BWP and the initial Downlink BWP may be collectively referred to as the initial BWP.

According to the above-described Alt. 1 to Alt. 17, when the terminal 20 does not support a carrier bandwidth broadcast by SIB 1, an uplink frequency bandwidth and a downlink frequency bandwidth can be clearly specified, which are for communication by the terminal 20 after the carrier bandwidth is indicated by SIB1 until the base station 10 configures, for the terminal 20, a channel bandwidth actually supported by the terminal 20 by dedicated signaling based on the UE capability received from the terminal 20.

MODIFIED EXAMPLES

When the terminal 20 is unable to support a carrier bandwidth indicated by SIB 1, an uplink frequency bandwidth for communication by the terminal 20 may be configured to be any one of the above-described Alt. 1 to Alt. 12, Alt. 13, Alt. 16, and Alt. 17, and a downlink frequency bandwidth for communication by the terminal 20 may be configured to be any one of the above-described Alt. 1 to Alt. 12, Alt. 13, Alt. 14, and Alt. 15, other than the one configured as the uplink frequency bandwidth.

For example, when the terminal 20 is unable to support a carrier bandwidth indicated by SIB 1, an uplink frequency bandwidth for communication by the terminal 20 may be configured to a minimum frequency bandwidth of a frequency bandwidth of CORESET #0 and a minimum frequency bandwidth supported by the terminal 20 (i.e., MIN {CORESET #0 BW, Minimum channel BW supported by the UE}), and a downlink frequency bandwidth for communication by the terminal 20 may be configured to be a maximum frequency bandwidth of a frequency bandwidth of CORESET #0 and a maximum frequency bandwidth supported by the terminal 20 (i.e., MAX {CORESET #0 BW, Maximum channel BW supported by the UE}).

For example, when the terminal 20 is unable to support a carrier bandwidth indicated by SIB 1, an uplink frequency bandwidth for communication by the terminal 20 may be configured to be a maximum frequency bandwidth of a frequency bandwidth of an initial Uplink BWP and a maximum frequency bandwidth supported by the terminal 20 (i.e., MAX{initial Uplink BWP BW, Maximum channel BW supported by UE}), and a downlink frequency bandwidth for communication by the terminal 20 may be configured to be a maximum frequency bandwidth of a bandwidth of an initial Downlink BWP and a maximum frequency bandwidth supported by the terminal 20 (i.e., MAX{initial Downlink BWP BW, Maximum channel BW supported by UE}).

(Supplementary Description of Initial BWP)

The above-described initial BWP may be specified as follows, for example.

If the terminal 20 is not configured with initialDownlinkBWP, an initial DL BWP may be defined by a location and number of contiguous PRBs, among a plurality of physical resource blocks (physical resource blocks, PRBs) of a TypeO-PDCCH CSS set, and a subcarrier spacing (Sub-Carrier Spacing, SCS) and a cyclic prefix for PDCCH reception in the TypeO-PDCCH CSS set. Here, the consecutive PRBs may be a plurality of PRBs of the CORESET of the Type 0-PDCCH CSS set, from the PRB with the smallest index to the PRB with the largest index (including the PRB with the smallest index and the PRB with the largest index).

If an initial DownlinkBWP is not configured for the terminal 20, an initial DL BWP may be configured by an information element initialDownlinkBWP. For operation in a primary cell or a secondary cell, an initial UL BWP may be configured for the terminal 20 by an information element initialUplinkBWP.

When a supplementary UL carrier is configured for the terminal 20, an initial UL BWP in the supplemental UL carrier may be configured for the terminal 20 by the initialUplinkBWP which is an information element.

An information element, initialDownlink BWP, may be, for example, a configuration of SpCell (MCG or SCG's PC well) and a SCell's initial downlink BWP. The network may configure an information element locationAndBandwidth (location and bandwidth in the frequency domain of a band width part) such that the initial downlink BWP includes the entire CORESET #0 of the serving cell in the frequency domain. Here, the terminal 20 may apply locationAndBandwidth only after receiving the RRCSetup/RRCResume/RRCRestablishment.

Additionally or alternatively, the information element initialDownlink BWP may be, for example, a dedicated (UE-specific) configuration of an initial downlink band width-part (i.e., DL BWP #0). If an optional information element is configured in the initialDownlinkBWP, the terminal 20 may set the BWP configured in the RRC (from the viewpoint of UE capability) to BWP #0. If an optional information element is not configured in the initialDownlinkBWP, the terminal 20 does not assume that the BWP configured by the RRC (from the viewpoint of UE capability) is BWP #0. If a BWP other than the initialDownlinkBWP is not configured, the network always configures the initialDownlinkBWP. If there is no dedicated part of the initial UL/DL BWP configuration, an initial BWP can be used, with some limitations. For example, DCI format 1_0 cannot be applied to switching BWP based on DCI. Accordingly, RRCReconfiguration is required for changing to another BWP.

The information element, initialDownlink BWP, may be, for example, a configuration of an initial uplink BWP of SpCell (MCG or SCG's PCell).

The information element initialUplinkBWP may be, for example, a dedicated (UE-specific) configuration of an initial uplink bandwidth part (i.e., UL BWP #0). If an optional information element is configured in the initialUplinkBWP, the terminal 20 may set a BWP configured in the RRC (from the perspective of UE capability) to BWP #0. If an optional information element is not configured in the initialUplinkBWP, the terminal 20 does not assume that the BWP configured by the RRC (from the perspective of UE capability) is BWP #0. If a BWP other than an initialUplinkBWP is not configured, the network always configures the initialUplinkBWP. If there is no dedicated part of the initial UL/DL BWP configuration, initial BWP can be used, with some limitations. For example, DCI format 1_0 cannot be applied to switching BWP based on DCI. Accordingly, RRCReconfiguration is required for changing to another BWP.

(Supplementary Uplink)

Usually, the transmit power of the terminal 20 is lower than the transmit power of the base station 10. Accordingly, coverage of an uplink is weaker than coverage of a downlink. In a case where the terminal 20 is located at the edge of a cell, the fact that the coverage of the uplink is weak can cause a problem on ensuring communication quality. As a method for solving such a problem, for example, it has been proposed to additionally use, for an uplink communication, a frequency lower than a frequency being used for the uplink communication. For example, in a case where a channel state is lowered, the base station 10 may request the terminal 20 to use a supplementary UL frequency.

In the following, an example of an operation of the terminal 20 related to a supplementary Uplink is described. It is assumed that a supplementaryUplink field is included in servingCellConfigCommon, which is an information element configured for the terminal 20 by the base station 10, and the terminal 20 supports one or more frequency bands indicated in frequencyBandList for the supplementary uplink.

In this case, the terminal 20 may determine that the supplementary uplink is configured in the serving cell in a case where the terminal 20 supports an uplink channel bandwidth configured by a maximum transmission bandwidth configuration that is smaller than or equal to a carrierBandwidth indicated in supplementaryUplink for subcarrier spacing (SCS) of an initial uplink BWP, and is wider than or equal to the bandwidth of the initial uplink BWP.

Additionally, the terminal 20 may apply a supported uplink channel bandwidth with a maximum transmission bandwidth that is contained within the carrierBandwidth of supplementaryUplink, and that is wider than or equal to the bandwidth of the initial uplink BWP of supplementaryUplink.

Here, the above-described carrierBandwidth may be a field included in SCS-SpecificCarrier that is an information element for providing a parameter used in determining an actual position of a carrier and a bandwidth, or a carrier bandwidth. The number of physical resource blocks (PRBs) may be specified by carrierBandwidth, and a width of a carrier may be specified by the number of PRBs.

(Device Configuration)

Next, examples of functional configurations of the base station 10 and the terminal 20 are described that perform the processing operation described above. The base station 10 and the terminal 20 include all the functions described in the embodiments. However, the base station 10 and the terminal 20 may include only a part of the functions described in the embodiments.

<The Base Station 10>

Figure 5:
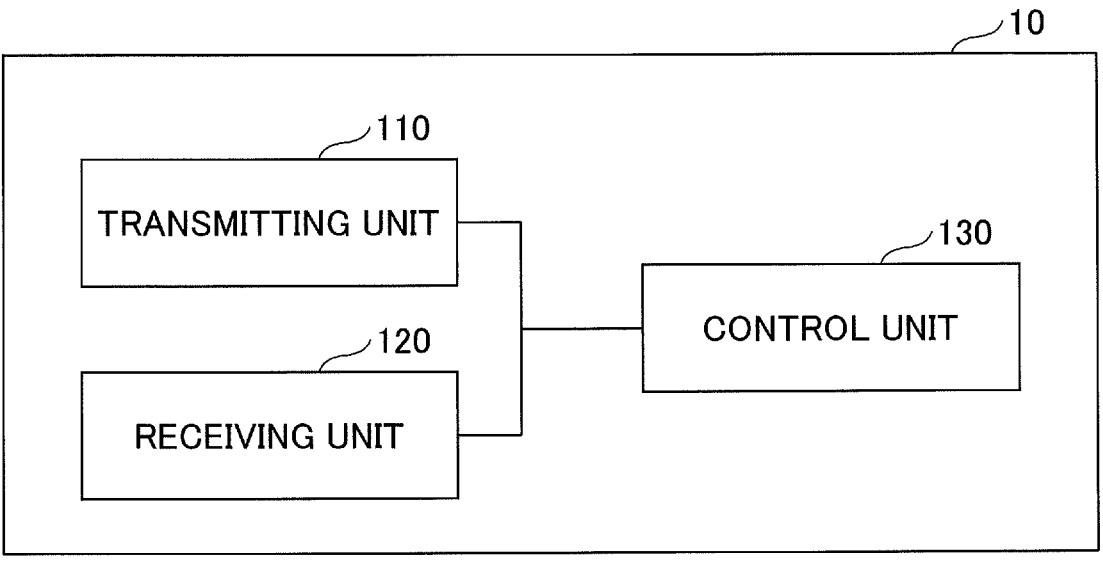
FIG. 5 is a diagram illustrating an example of a functional configuration of a terminal.

FIG. 5 is a diagram illustrating an example of a functional configuration of the base station 10. As illustrated in FIG. 5, the base station 10 includes a transmitting unit 110, a receiving unit 120, and a control unit 130. The functional configuration illustrated in FIG. 5 is only one example. If the operation according to the embodiments can be executed, functional divisions and names of the functional units may be any divisions and names.

The transmitting unit 110 creates a transmission signal from transmission data and wirelessly transmits the transmission signal. The receiving unit 120 receives various signals wirelessly and obtains higher layer signals from the received physical layer signals. The receiving unit 120 includes a measuring unit that measures a received signal and obtains a received power.

The control unit 130 controls the base station 10. The function of the control unit 130 related to transmission may be included in the transmitting unit 110, and the function of the control unit 130 related to reception may be included in the receiving unit 120.

In the base station 10, the control unit 130 configures the controlResourceSetZero in the PDCCH-ConfigSIB 1 which is an information element included in the MIB, and the transmitting unit 110 transmits the MIB to the terminal 20. In the base station 10, the control unit 130 configures the channel bandwidth commonly used by the terminal 20 in the carrier Bandwidth information element included in the SCS-SpecificCarrier information element included in the SIB 1, and the transmitting unit 110 transmits the SIB 1 including the carrier Bandwidth information element to the terminal 20.

Furthermore, in the base station 10, the control unit 130 may configure the terminal 20 to apply a DL channel bandwidth derived by a condition X to a carrierBandwidth information element in a SCS-SpecificCarrier Information Element included in SIB1 for a frequency band and subcarrier spacing in a cell, until reception of RRCSetup/RRCResume/RRCReestablishment, if the terminal 20 does not support a DL channel bandwidth indicated by a carrierBandwidth field in DownlinkConfigCommon/DownlinkConfigCommonSIB. The control unit 130 may configure the terminal 20 to apply a UL channel bandwidth derived by the condition X for the frequency band and the subcarrier spacing in the cell, until reception of RRCSetup/RRCResume/RRCReestablishment, if the terminal 20 does not support a UL channel bandwidth indicated by the carrierBandwidth field in UplinkConfigCommon/UplinkConfigCommonSIB. The transmitting unit 110 may transmit SIB1 including the carrierBandwidth information element to the terminal 20.

<Terminal 20>

Figure 6:
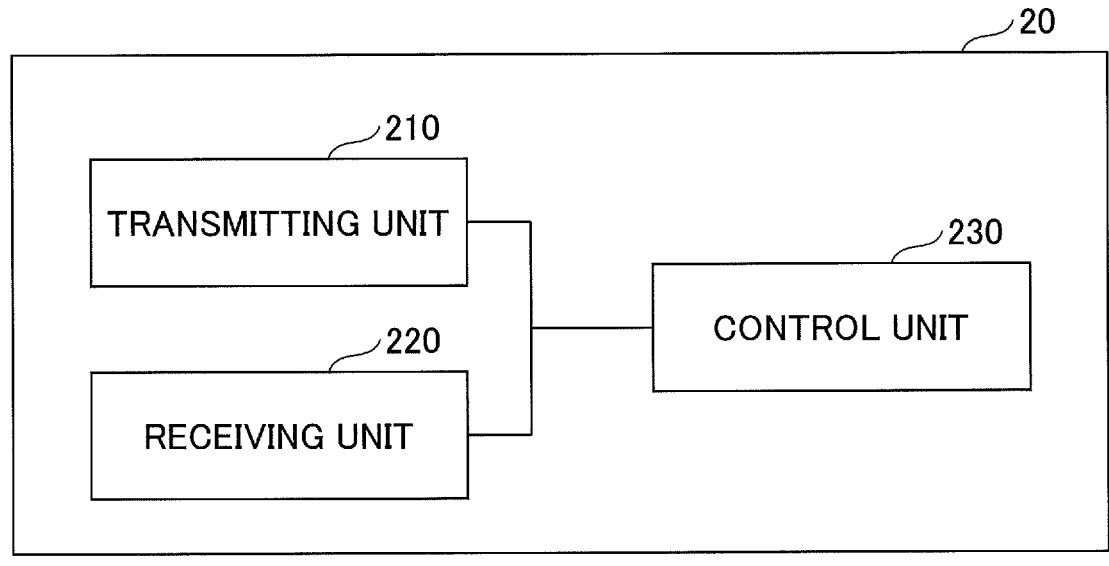
FIG. 6 is a diagram illustrating an example of a functional configuration of a base station.

FIG. 6 is a diagram illustrating an example of a functional configuration of the terminal 20. As illustrated in FIG. 6, the terminal 20 includes a transmitting unit 210, a receiving unit 220, and a control unit 230. The functional configuration illustrated in FIG. 6 is only one example. The functional division and the names of the functional units may be any division and names, provided that the operation according to the present invention can be executed.

The transmitting unit 210 includes a function for generating a signal to be transmitted to the base station 10 and transmitting the signal wirelessly. The receiving unit 220 includes a function for receiving various signals transmitted from the base station 10 and acquiring, for example, information of a higher layer from the received signals. The receiving unit 220 includes a measuring unit for measuring a signal to be received and for obtaining received power.

The control unit 230 controls the terminal 20. A function of the control unit 230 related to transmission may be included in the transmitting unit 210, and a function of the control unit 230 related to reception may be included in the receiving unit 220.

For example, in the terminal 20, the receiving unit 220 receives a MIB by receiving a SS/PBCH block, and the control unit 230 configures the controlResourceSetZero and searchSpaceZero based on the PDCCH-ConfigSIB1 included in the MIB.

In the terminal 20, the receiving unit 220 monitors the PDCCH and receives the SIB1 based on the configurations of the controlResourceSetZero and searchSpaceZero configured by the control unit 230. Furthermore, in the terminal 20, upon detecting that a channel bandwidth indicated by SIB1 is not supported, the control unit 230 may apply a DL channel bandwidth derived by the above-described condition X and/or may apply a UL channel bandwidth derived by the above-described condition X, until reception of RRC-Setup/RRCResume/RRCReestablishment.

<Hardware Configuration>

The block diagrams (FIG. 5 to FIG. 6) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 7:
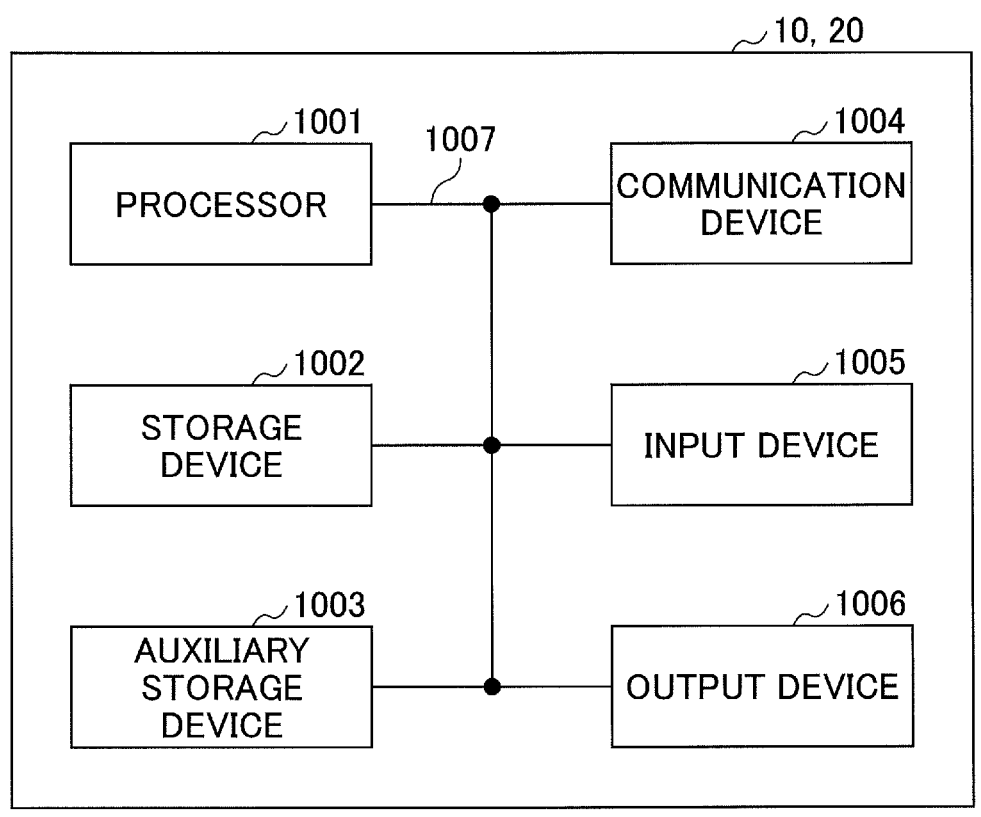
FIG. 7 is a diagram illustrating an example of a hardware configuration of a terminal and a base station.

For example, each of the base station 10 and the terminal 20 according to an embodiment of the present invention may function as a computer performing the process according to the embodiments. FIG. 7 is a diagram illustrating an example of a hardware configuration of the base station 10 and the terminal 20 according to the embodiment. Each of the above-described base station 10 and terminal 20 may be physically configured as a computer device including a processor 1001, a storage device 1002, an auxiliary storage device 1003, a communication device 1004, an input device 1005, an output device 1006, a bus 1007, and the like.

In the following description, the term "device" can be replaced with a circuit, a device, a unit, or the like. The hardware configuration of the base station 10 and terminal 20 may include one or more of the devices denoted by 1001-1006 in the figure, or may be configured without some devices.

Each function of the base station 10 and terminal 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, data, and the like, from at least one of the auxiliary storage device 1003 and the communication device 1004 to the storage device 1002, and executes various processes according to these. As the program, a program is used that causes a computer to execute at least a part of the operations described in the above-described embodiments. For example, the control unit 130 of the base station 10 may be implemented by a control program that is stored in the storage device 1002 and that is operated by the processor 1001, and other functional blocks may be similarly implemented. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), and the like. The storage device 1002 may be referred to as a register, a cache, a main memory (main storage device), or the like. The storage device 1002 may store a program (program code), a software module, or the like, which can be executed for implementing the radio communication method according to one embodiment of the present disclosure.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The auxiliary storage device 1003 may be referred to as an auxiliary storage device. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like, to implement at least one of frequency division duplex (FDD: Frequency Division Duplex) and time division duplex (TDD: Time Division Duplex).

The input device 1005 is an input device (e.g., a keyboard, a mouse, a microphone, a switch, a button, and/or a sensor) that receives an external input. The output device 1006 is an output device (e.g., a display, a speaker, and/or an LED lamp) that performs output toward outside. The input device 1005 and the output device 1006 may be configured to be integrated (e.g., a touch panel).

Each device, such as the processor 1001 and the storage device 1002, is also connected by the bus 1007 for communicating information. The bus 1007 may be formed of a single bus or may be formed of different buses between devices.

The base station 10 and the terminal 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

CONCLUSION OF THE EMBODIMENTS

In the specification, at least the terminal and the communication method described below are disclosed.

A terminal including a receiving unit that receives system information; and a control unit, wherein, in a case where the system information received by the receiving unit includes information related to a Supplementary Uplink, and a configuration of a maximum bandwidth, from among one or more bandwidths for the Supplementary Uplink, is supported, the control unit configures the maximum bandwidth as a frequency bandwidth for communicating through the Supplementary Uplink.

According to the above-described configuration, in a case where the terminal supports the configuration of the maximum bandwidth, from among bandwidths for the Supplementary Uplink indicated by SIB1, a frequency bandwidth for the terminal to communicate through the Supplementary Uplink can be clearly specified, after the carrier bandwidths are indicated by the SIB1 and until the base station configures, based on UE capability received from the terminal, a channel bandwidth actually supported by the terminal by using dedicated signaling.

The configuration of the maximum bandwidth may be smaller than or equal to a carrierBandwidth indicated in the information related to the Supplementary Uplink for subcarrier spacing of an initial uplink Bandwidth Part (BWP), and the configuration of the maximum bandwidth may be wider than or equal to a bandwidth of the initial uplink BWP.

The carrierBandwidth may be specified by a number of physical resource blocks.

In a case where the configuration of the maximum bandwidth is supported, the control unit may determine that the Supplementary Uplink is configured in a serving cell.

A communication method executed by a terminal, the method including receiving system information; and, in a case where the received system information includes information related to a Supplementary Uplink, and a configuration of a maximum bandwidth, from among one or more bandwidths for the Supplementary Uplink, is supported, configuring the maximum bandwidth as a frequency bandwidth for communicating through the Supplementary Uplink.

SUPPLEMENTAL EMBODIMENT

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station 10 and the terminal 20 are described using the functional block diagrams, but such devices may be implemented by hardware, software, or a combination thereof. Software executed by the processor included in the base station 10 according to the embodiments of the present invention and software executed by the processor included in the terminal 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information or the like may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a predetermined value).

The aspects/embodiments described in this disclosure may be used alone, in combination, or switched with implementation. Notification of predetermined information (e.g., "X" notice) is not limited to a method that is explicitly performed, and may also be made implicitly (e.g., "no notice of the predetermined information").

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC: Component Carrier) may be referred to as a "carrier frequency," a "cell," or the like.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "Base Station (BS)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "Mobile Station (MS)," "user terminal," "User Equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of Things (IoT) device such as a sensor.

Furthermore, the base station in the present disclosure may be replaced with a user terminal. For example, each aspect/embodiment of the present disclosure may be applied to a configuration in which communication between the base station and the user terminal is replaced with communication between a plurality of user terminals (for example, which may be referred to as Device-to-Device (D2D) or Vehicle-to-Everything (V2X)). In this case, the user terminal 20 may have the functions of the terminal 20 described above. Furthermore, the terms "uplink" and "downlink" may be replaced with terms corresponding to inter-terminal communication (for example, "side"). For example, an uplink channel, a downlink channel, or the like may be replaced with side channels. Similarly, the user terminal in the present disclosure may be replaced with the base station. In this case, the terminal 20 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

In a case in which "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like.

The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names respectively corresponding to them may be used.

For example, one subframe may be referred to as a transmission time interval (TTI: Transmission Time Interval), or a plurality of consecutive subframes may be referred to as a TTI, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of assigning a radio resource (a frequency bandwidth, a transmission power, or the like which can be used in each user terminal) to each terminal in units of TTIs. The definition of the TTI is not limited thereto.

The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI.

Note that, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Note that, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. Each of one TTI, one subframe, or the like may be formed of one or more resource blocks.

Furthermore, one or more RBs may be referred to as a physical resource block (PRB: Physical RB), a subcarrier group (SCG: Subcarrier Group), a resource element group (REG: Resource Element Group), a PRB pair, an RB pair, or the like.

Furthermore, a resource block may be formed of one or more resource elements (RE: Resource Element). For example, one RE may be a radio resource region of one subcarrier and one symbol.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS

10 base station
110 transmitting unit
120 receiving unit
130 control unit
20 terminal
210 transmitting unit
220 receiving unit
230 control unit
1001 processor
1002 storage device
1003 auxiliary storage device
1004 communication device
1005 input device
1006 output device

The invention claimed is:

1. A terminal comprising:
a receiver that receives system information; and
a processor,
wherein
in a case where the system information received by the receiver includes information related to a Supplementary Uplink, and a configuration of a maximum bandwidth, from among one or more bandwidths for the Supplementary Uplink, is supported, the processor configures the maximum bandwidth as a frequency bandwidth for communicating through the Supplementary Uplink and determines that the Supplementary Uplink is configured in a serving cell,
the configuration of the maximum bandwidth is smaller than or equal to a carrierBandwidth indicated in the information related to the Supplementary Uplink for subcarrier spacing of an initial uplink Bandwidth Part (BWP), and the configuration of the maximum bandwidth is wider than or equal to a bandwidth of the initial uplink BWP,
a frequency bandwidth for performing downlink communication is based on a value indicated by four most significant bits of PDCCH-ConfigSIB1 until reception of RRCSetup or RRCResume or RRCRestablishment, and
the carrierBandwidth is specified based on an information element indicating a location of a direct current of a carrier and a subcarrier spacing of the carrier.

2. A communication method executed by a terminal, the method comprising:
receiving system information; and
in a case where the received system information includes information related to a Supplementary Uplink, and a configuration of a first maximum bandwidth, from among one or more bandwidths for the Supplementary Uplink, is supported, configuring the first maximum bandwidth as a frequency bandwidth for communicating through the Supplementary Uplink and determines that the Supplementary Uplink is configured in a serving cell,
wherein
the configuration of the first maximum bandwidth is smaller than or equal to a carrierBandwidth indicated in the information related to the Supplementary Uplink for subcarrier spacing of an initial uplink Bandwidth Part (BWP), and the configuration of the maximum bandwidth is wider than or equal to a bandwidth of the initial uplink BWP, a frequency bandwidth for performing downlink communication is based on a value indicated by four most significant bits of PDCCH-ConfigSIB1 until reception of RRCSetup or RRCResume or RRCRestablishment, and the carrierBandwidth is specified based on an information element indicating a location of a direct current of a carrier and a subcarrier spacing of the carrier.

3. A radio communication system comprising:

a base station; and a terminal, wherein the base station includes a transmitter that transmits system information to the terminal, and wherein the terminal includes:

a receiver that receives the system information; and a processor, wherein in a case where the system information received by the receiver includes information related to a Supplementary Uplink, and a configuration of a maximum bandwidth, from among one or more bandwidths for the Supplementary Uplink, is supported, the processor configures the maximum bandwidth as a frequency bandwidth for communicating through the Supplementary Uplink and determines that the Supplementary Uplink is configured in a serving cell, the configuration of the maximum bandwidth is smaller than or equal to a carrierBandwidth indicated in the information related to the Supplementary Uplink for subcarrier spacing of an initial uplink Bandwidth Part (BWP), and the configuration of the maximum bandwidth is wider than or equal to a bandwidth of the initial uplink BWP, a frequency bandwidth for performing downlink communication is based on a value indicated by four most significant bits of PDCCH-ConfigSIB1 until reception of RRCSetup or RRCResume or RRCRestablishment, and the carrierBandwidth is specified based on an information element indicating a location of a direct current of a carrier and a subcarrier spacing of the carrier.

* * * * *